(12) United States Patent
Wieczorek et al.

(10) Patent No.: US 12,286,795 B2
(45) Date of Patent: Apr. 29, 2025

(54) METHOD FOR APPLYING A STRUCTURED SURFACE TO A BUILDING SURFACE AND CORRESPONDING COVERING ELEMENT

(71) Applicant: Knauf Gips KG, Iphofen (DE)

(72) Inventors: Thomas Wieczorek, Mainbernheim (DE); Igor Eisenbraun, Mainbernheim (DE)

(73) Assignee: Knauf Gips KG, Iphofen (DE)

( * ) Notice: Subject to any disclaimer, the term of this patent is extended or adjusted under 35 U.S.C. 154(b) by 537 days.

(21) Appl. No.: 17/285,985

(22) PCT Filed: Oct. 17, 2018

(86) PCT No.: PCT/EP2018/000474
§ 371 (c)(1),
(2) Date: Apr. 16, 2021

(87) PCT Pub. No.: WO2020/078524
PCT Pub. Date: Apr. 23, 2020

(65) Prior Publication Data
US 2021/0381247 A1 Dec. 9, 2021

(51) Int. Cl.
*E04F 13/00* (2006.01)
*C09D 5/28* (2006.01)
(Continued)

(52) U.S. Cl.
CPC ............ *E04F 13/002* (2013.01); *C09D 5/28* (2013.01); *C09D 7/43* (2018.01); *C09D 7/61* (2018.01); *D06N 7/0002* (2013.01); *E04F 13/02* (2013.01)

(58) Field of Classification Search
CPC ......... E04F 13/02; E04F 13/002; E04F 13/00; E04F 21/02; E04F 21/023; C09D 7/43; C09D 7/61; C09D 5/28; D06N 7/0002; D06N 2205/10; Y10T 428/24355; Y10T 428/24372; C09J 7/20; C09J 7/21; C09J 7/32; C09J 7/40; C09J 2203/346; C09J 2301/16
See application file for complete search history.

(56) References Cited

U.S. PATENT DOCUMENTS 3,674,533 A * 7/1972 Matsubara et al. ..... C04B 26/28
427/214
4,127,433 A 11/1978 Gurgui et al.
(Continued)

FOREIGN PATENT DOCUMENTS

DE 2053951 A1 * 5/1972
DE 3111899 A1 10/1982
(Continued)

OTHER PUBLICATIONS

Translation of DE2053951A1 (bib, description and claims). (Year: 1972).*
(Continued)

*Primary Examiner* — Catherine A. Simone
(74) *Attorney, Agent, or Firm* — The Webb Law Firm

(57) ABSTRACT

The invention pertains to a method for applying a structured surface to a building surface, particularly for the interior design of a room, wherein a carrier material is provided with a surface structure and the carrier material with this surface structure is applied to the building surface.

23 Claims, 4 Drawing Sheets

(51) Int. Cl.
  *C09D 7/43* (2018.01)
  *C09D 7/61* (2018.01)
  *D06N 7/00* (2006.01)
  *E04F 13/02* (2006.01)

(56) References Cited

U.S. PATENT DOCUMENTS 5,565,252 A * 10/1996 Finestone .............. B65D 27/00
  52/309.3
2002/0020328 A1 2/2002 Krenz

FOREIGN PATENT DOCUMENTS

| | | |
|---|---|---|
| DE | 102009004364 A1 | 7/2009 |
| KR | 1020050122929 | 12/2005 |
| WO | 9745607 A1 | 12/1997 |
| WO | 9817855 A1 | 4/1998 |

OTHER PUBLICATIONS

Translation of WO9817855A1 (description and claims). (Year: 1998).*

* cited by examiner

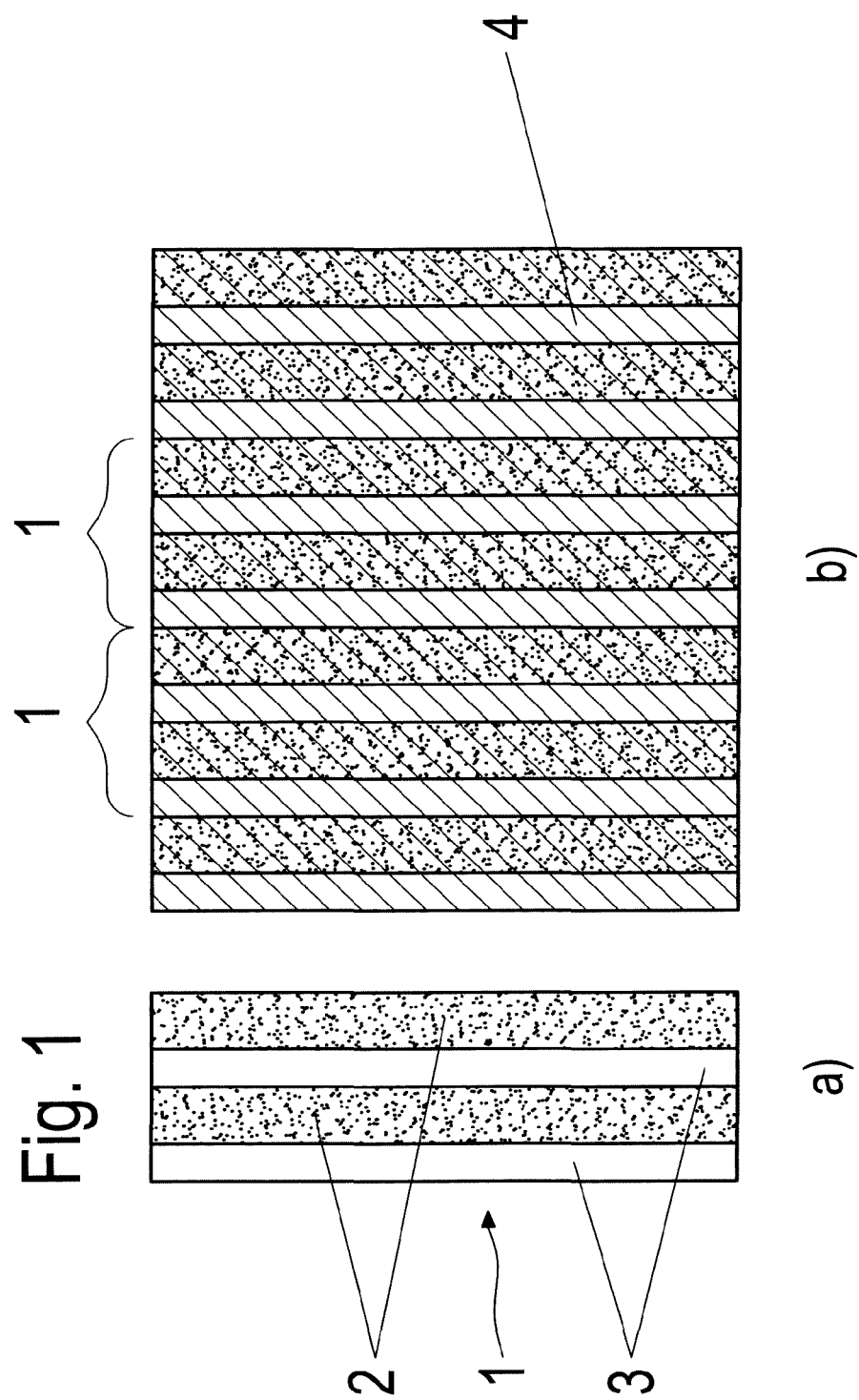

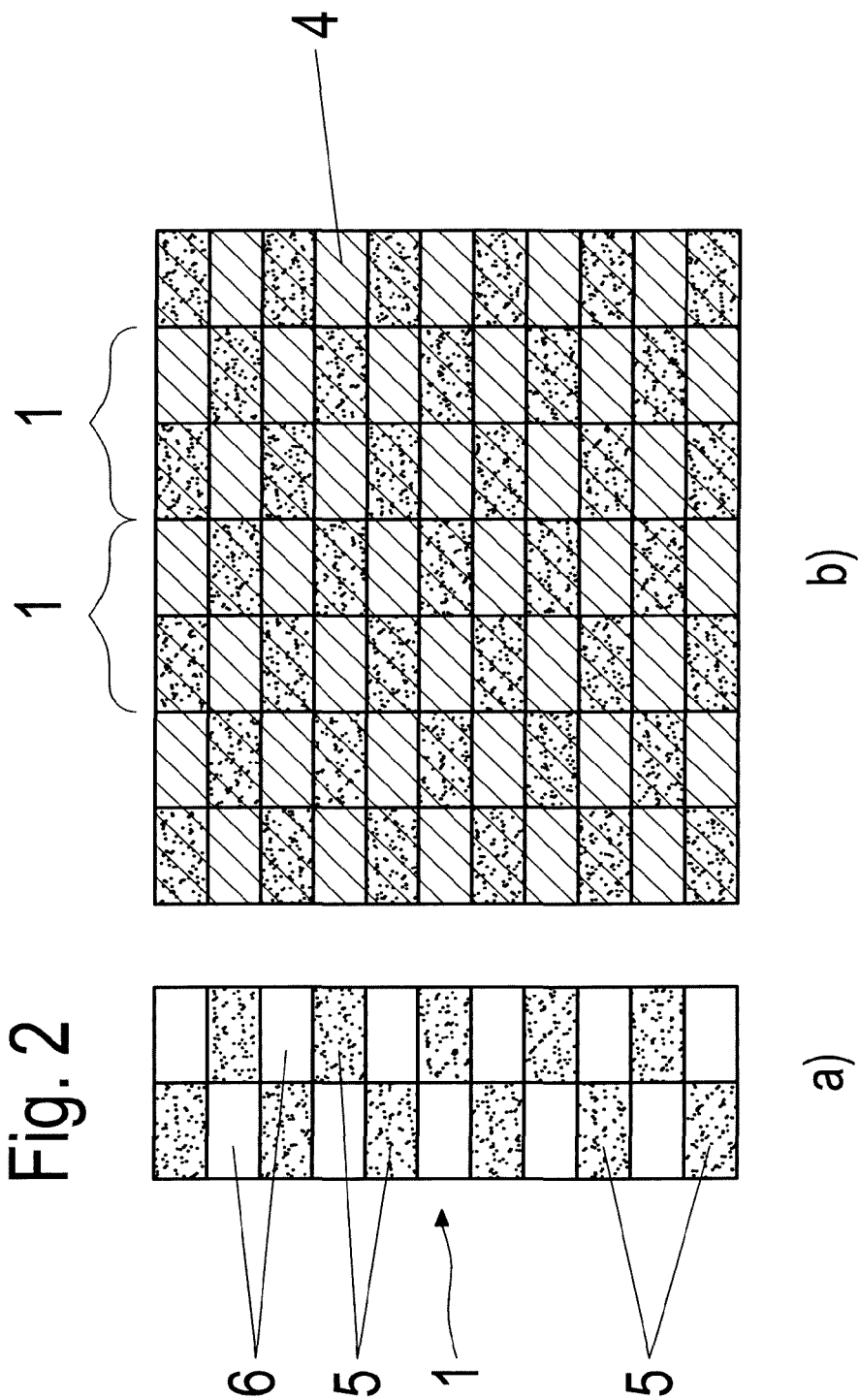

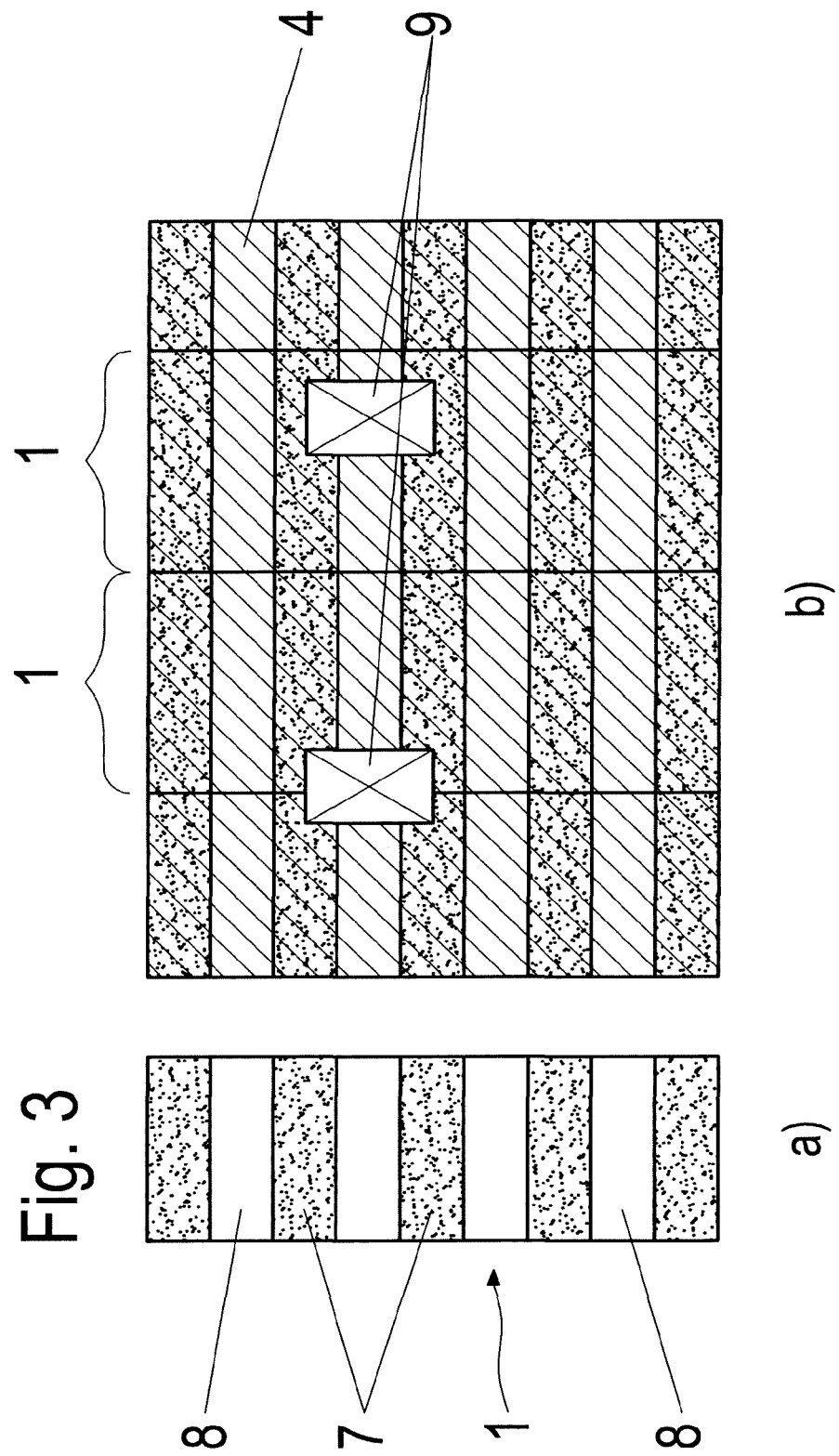

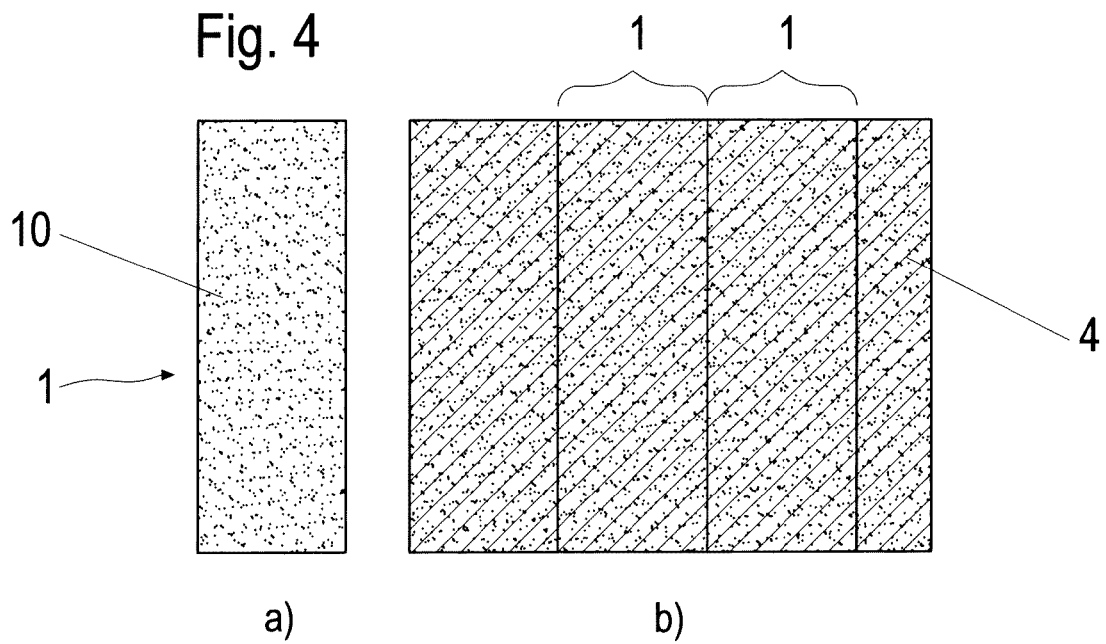

METHOD FOR APPLYING A STRUCTURED SURFACE TO A BUILDING SURFACE AND CORRESPONDING COVERING ELEMENT

CROSS-REFERENCE TO RELATED APPLICATION

This application is the United States national phase of International Application No. PCT/EP2018/000474 filed Oct. 17, 2018, the disclosure of which is hereby incorporated by reference in its entirety.

BACKGROUND OF THE INVENTION

Field of the Invention

The invention pertains to a method for applying a structured surface to a building surface, particularly for the interior design of a room, wherein a carrier material is provided with a surface structure and the carrier material with this surface structure is applied to the building surface.

Description of Related Art

The invention furthermore pertains to a covering element for a building surface, preferably for carrying out the aforementioned method.

A method of the aforementioned type and a corresponding covering element, namely a multilayer coating, are basically known from DE 31 11 899 A1. However, this publication concerns a weather-resistant wallpaper for covering an exterior wall of a building.

Various structured wallpapers for the interior design of building surfaces, especially building walls, such as the well-known ingrain wallpaper, but also wallpapers with structures of foamed material or textiles, are available on the market.

Alternatively, interior walls may not be provided with any wallpaper at all, i.e. a plaster surface remains "exposed" and is possibly provided with a coat of paint. In this case, a decorative design or décor of this plaster surface can be achieved by producing a structured plaster surface. This can be realized, for example, by carrying out the plastering process with a plastering board that is not completely smooth, but rather comprises thorns or spikes in order to produce structured lines in the plaster surface.

Known wallpapers have a rather artificial appearance, but by no means the appearance of structured plaster.

However, the above-described structured plastering frequently has a rather random appearance and requires highly skilled and experienced workmanship and is therefore correspondingly expensive.

SUMMARY OF THE INVENTION

The invention is based on the objective of disclosing a method, by means of which a plaster-like appearance of a structured surface can be easily produced on a building surface.

According to the invention, this objective is attained with a method, in which a carrier material is provided with a surface structure and the carrier material with this surface structure is applied to the building surface, wherein said method is characterized in that the surface structure on the carrier material is formed by a mineral graining.

In this way, the invention advantageously makes it possible to easily produce a plaster-like structured surface with a plaster-like appearance. It is merely required to apply the inventively designed and equipped carrier material to the building surface, which could essentially be realized similar to wallpapering. The carrier material provided with the surface structure particularly could be provided in the form of rolls. It could be unrolled and then applied, e.g. glued, to the building surface in the form of webs that are correspondingly cut to size. The inventive carrier material with its surface structure could therefore be referred to as "plaster on a roll."

Since the carrier material can be easily handled and its surface structure is predefined, the inventive method could basically also be carried out by a layman, preferably in a reproducible manner and with consistent quality.

According to another embodiment of the inventive method the graining can be formed by rocks, particularly natural rocks, preferably carbonate rocks, silicate rocks and/or silicate minerals.

The graining preferably can be chosen with respect to essential design aspects, particularly coarser or less coarse such as in grain sizes between grit and gravel. In other words, this could preferably also include, for example, the grain size classes medium sand, coarse sand, fine gravel (grus) and medium gravel (pea gravel). Rocks, particularly natural rocks, preferably silicate rocks and/or silicate minerals, may be used for producing the graining. In a preferred embodiment, for example, a relatively coarse so-called "Spar Dash" design could be realized. Different grain sizes may also be chosen for a graining, for example, in order to obtain a grain structure that comprises a large grain (also called finishing grain or structuring grain) and fine fractions. In this case, the large grain or structuring grain is the largest grain (of a number of differently sized grains) of the grain structure, which is ultimately decisive for the character of the surface structure.

Perlite, preferably expanded perlite, could also be used for the graining in order to lower the weight of the surface structure.

Another embodiment of the inventive method is characterized in that the graining is bound to the carrier material by means of a binder, preferably a low-viscosity binder. In this case, a water-soluble and/or reversibly binding binder is preferably used.

A dispersion, e.g. in the form of a dispersible polymer powder, may be considered for such a preferred binder. For example, dispersions sold by Wacker in the form of dispersible polymer powders under the brand name "Vinnapas" may be considered as corresponding dispersions.

Among other things, this has the particular advantage that the binder can separate (from the graining) preferably dissolve when the carrier material is applied to a moist substructure. In this way, the graining can separate from the carrier material to such a degree, for example, that it can be displaced in a somewhat less obstructed manner. The structuring grain of the graining can thereby be aligned in an ordered manner, for example, by smoothing or sweeping over the graining.

According to another embodiment, it is proposed to use at least one thickener, preferably methyl cellulose. In this way, the volume of the binder could be increased in order to carry more graining. For example, products sold by SE Tylose GmbH & Co. KG such as Tylose MH 10007 may be considered as thickener. However, other cellulose ethers may likewise be considered as thickener.

Another embodiment of the inventive method is characterized in that additives, which preferably affect the structure and/or the interconnection, may be added.

As a mere example, the additives may comprise, among other things, liquefiers and/or pore forming materials. A pore forming material could contribute to producing the structure by itself and/or together with a graining. A liquefier could respectively improve or promote, in particular, the interconnection between the carrier material and the graining.

According to an embodiment of the invention, a prepared compound consisting of the graining and additives could also be used. This compound could then be applied to the carrier material.

A particularly preferred embodiment of the inventive method is characterized in that the carrier material used can separate preferably dissolve, under the influence of moisture.

This inventive solution has the particular advantage that the carrier material merely serves for easily applying the graining to the building surface. The graining is then released from the carrier material and behaves accordingly. The carrier material itself separates or dissolves at least to such a degree that it loses its carrying capacity. This embodiment all the more justifies the above-cited reference to a "plaster on a roll." According to an embodiment of the invention, a dispersion is preferably considered as carrier material. A non-separating or non-dissolving carrier material could be, for example, a glass fiber mat or a synthetic fiber mat.

According to another embodiment of the invention, it is proposed that the carrier material is realized in a foil-like manner, i.e. not necessarily in the form of a woven fabric or netting. A carrier that is as thin as possible, but has a laminar carrying capacity, could particularly be used for a dissolving carrier material. This carrier material can be used in the form of a sheet or in the form of a material web, which preferably can also be rolled up together with the surface structure. This can be achieved, for example, with the aid of a dispersion. In this context, the term foil may also refer to a film or a skin, which in turn could imply different production methods.

Another embodiment of the inventive method is characterized in that spackle is initially applied to the building surface, and in that the carrier material with its surface structure is then applied to the spackle. When a dissolving carrier material is used, in particular, the spackle and the graining advantageously form a structured plaster, in which the graining can still be freely (re)structured by processing the surface with suitable tools such as a trowel, preferably a smoothing trowel, a lambskin roll, a friction disc, a plastering board or a screed board. The spackle is preferably applied to the building surface in the form of strip-shaped sections (also called webs), the width of which approximately corresponds to the width of the carrier material webs. As the application of additional webs progresses, the carrier material of one of the previously applied webs may already dissolve. As spackle (or putty or knifing filler) a mineral spackle may be considered, preferably a lime spackle. A gypsum spackle may also be considered. Furthermore, the inventive surface structure could ultimately be provided with a coat of paint.

Independent protection is also claimed for an inventive covering element for covering a building surface, particularly an interior wall of a room, comprising a carrier material, to which a surface structure is applied, preferably a carrier material rollable up together with its surface structure, preferably for executing the inventive method. From such a roll, single webs or strips may be cut then. As an independent solution to the above-defined objective, the method is characterized in that the surface structure is formed by a mineral graining.

Preferred embodiments are disclosed in the corresponding claims and their advantages can be analogously gathered from the preceding description of the inventive method in order to avoid unnecessary repetitions.

The inventive covering element preferably may be characterized, in particular, in that the graining is formed by rocks, particularly natural rocks, preferably carbonate rocks, silicate rocks and/or silicate minerals. In this case, the graining preferably comprises at least one grain size in the range between grit and gravel, particularly a grain size of at least one of the grain size classes medium sand, coarse sand, fine gravel (grus) and medium gravel (pea gravel).

The graining may comprise perlite, preferably expanded perlite.

According to another embodiment, the graining may be preferably bound to the carrier material by means of a binder, preferably a low-viscosity binder. It is particularly preferred that the graining is bound to the carrier material by means of a water-soluble and/or reversibly binding binder.

According to another preferred embodiment of the invention, the inventive wall covering element is advantageously characterized in that the carrier material used can separate, preferably dissolve, under the influence of moisture.

The carrier material is preferably realized in a foil-like or film-like or skin-like manner and may essentially be produced of a dispersible polymer powder.

BRIEF DESCRIPTION OF THE DRAWINGS

Exemplary embodiments forming the basis of further inventive features as well, which are to be considered merely as exemplary however and which are not intended to limit the subject matter of the invention or the scope of protection thereof, are shown in the drawings, in which:

FIG. 1 schematically shows in FIG. 1a) a view of a first exemplary embodiment of an inventive carrier material in the form of a web material with a strip-shaped longitudinal graining structure and in FIG. 1b) multiple carrier material webs, which are arranged adjacent to one another on a (hatched) spackle layer, FIG. 2 schematically shows in FIG. 2a) a view of a second exemplary embodiment of an inventive carrier material in the form of a web material with an essentially chequered graining structure and in FIG. 2b) multiple carrier material webs, which are arranged adjacent to one another on a (hatched) spackle layer, FIG. 3 schematically shows in FIG. 3a) a view of a third exemplary embodiment of an inventive carrier material in the form of a web material with a strip-shaped transverse graining structure and in FIG. 3b) multiple carrier material webs, which are arranged adjacent to one another on a building surface with window openings, and FIG. 4 schematically shows in FIG. 4a) a view of a fourth exemplary embodiment of an inventive carrier material in the form of a web material with a graining structure over its entire surface and in FIG. 4b) multiple carrier material webs, which are arranged adjacent to one another on a on a (hatched) spackle layer.

DESCRIPTION OF THE INVENTION

FIG. 1 shows in FIG. 1a) a view of a first exemplary embodiment of an inventive carrier material in the form of a web material with a strip-shaped longitudinal graining structure.

In this first exemplary embodiment, a carrier material web 1 comprises longitudinal strip-shaped sections 2 with a graining that is indicated in a dotted manner. In addition, the carrier material strip 1 also comprises strip-shaped sections 3 without graining.

For example, the carrier material may also be delivered in the form of material sheets rather than a web material.

In FIG. 1*b*), multiple carrier material strips 1 according to FIG. 1*a*) are arranged adjacent to one another on a (hatched) spackle layer 4.

FIG. 2 shows in FIG. 2*a*) a view of a second exemplary embodiment of an inventive carrier material in the form of a web material with an essentially chequered graining structure.

In this second exemplary embodiment, the carrier material web 1 comprises sections 5 with a graining and sections 6 without graining.

FIG. 2*b*) once again shows multiple carrier material strips 1, in this case according to FIG. 2*a*), which are arranged adjacent to one another on a (hatched) spackle layer 4. Since the graining should form the surface structure of the spackle layer 4, the graining in this case also slightly protrudes from the spackle layer 4 just as in FIG. 1*b*). However, the spackle layer 4 is provided in all regions and therefore illustrated everywhere in the form of a hatching (as in all other exemplary embodiments).

FIG. 3 shows in FIG. 3*a*) a view of a third exemplary embodiment of an inventive carrier material in the form of a web material with a strip-shaped transverse graining structure.

In contrast to the first exemplary embodiment according to FIG. 1*a*), transverse strip-shaped sections 7 with a graining and transverse strip-shaped sections 8 without graining are provided in FIG. 3*a*).

FIG. 3*b*) shows multiple carrier material strips 1 according to FIG. 3*a*), which are arranged adjacent to one another on a building wall. A spackle layer 4, in which the carrier material webs 1 are embedded, is also provided in this case and illustrated in the form of a hatching. Alternatively, an adhesive could also be used in all embodiments. Furthermore, exemplary window openings 9 in the building wall are indicated in this figure and incorporated into the inventive building surface design.

FIG. 4 shows in FIG. 4*a*) a view of a fourth exemplary embodiment of an inventive carrier material in the form of a web material with a graining structure over its entire surface (10).

FIG. 4*b*) again shows multiple carrier material webs, which are arranged adjacent to one another on a on a (hatched) spackle layer (4). This is the most simple way of using the here claimed invention resulting in a surface structure over the entire surface of the building surface where the invention was applied.

The invention claimed is:

1. A method for applying a structured surface to a building surface, wherein a carrier material is provided with a surface structure and the carrier material with this surface structure is applied to the building surface,
   wherein the surface structure is formed by a mineral graining; and the carrier material used is a dispersion and dissolvable and separates from the mineral graining under an influence of moisture.

2. The method according to claim 1, wherein the graining is formed by rocks.

3. The method according to claim 2, wherein the graining is formed by carbonate rocks, silicate rocks and/or silicate minerals.

4. The method according to claim 1, wherein perlite is used for the graining.

5. The method according to claim 1, wherein the graining comprises grain sizes from grit to gravel.

6. The method according to claim 5, wherein the graining comprises grain sizes chosen from at least one of the grain size classes medium sand, coarse sand, fine gravel, and medium gravel.

7. The method according to claim 1, wherein the graining is bound to the carrier material by means of a binder.

8. The method according to claim 7, wherein the binder is a low-viscosity binder.

9. The method according to claim 7, wherein the binder used is water-soluble and/or reversibly binding.

10. The method according to claim 1, wherein additives, which influence the structure and/or an interconnection, are added.

11. The method according to claim 10, wherein a compound comprising the graining and additives, which influence the structure and/or the interconnection, is used.

12. The method according to claim 1, wherein at least one thickener is used.

13. The method according to claim 1, wherein the carrier material is realized in a sheet.

14. The method according to claim 1, wherein a spackle is initially applied to the building surface, and in that the carrier material with its surface structure is then applied to the spackle.

15. The method according to claim 1, wherein the method is for the interior design of a room.

16. A covering element for covering a building surface, comprising a carrier material, to which the surface structure is applied for executing the method according to claim 1,
   wherein the surface structure is formed by a mineral graining.

17. The covering element according to claim 16, wherein the graining is formed by rocks.

18. The covering element according to claim 16, wherein the graining comprises perlite.

19. The covering element according to claim 16, wherein the graining comprises at least one grain size from grit to gravel.

20. A covering element for covering a building surface, comprising a carrier material, to which the surface structure is applied for executing the method according to claim 14, wherein the graining is bound to the carrier material by means of a binder.

21. The covering element according to claim 20, wherein the binder used is water-soluble and/or reversibly binding.

22. A covering element for covering a building surface, comprising a carrier material, to which the surface structure is applied for executing the method according to claim 14, wherein the carrier material is a film.

23. A covering element for covering a building surface, comprising a carrier material, to which the surface structure is applied for executing the method according to claim 14, wherein the carrier material is produced of a dispersible polymer powder.

* * * * *